United States Patent [19]

McArthur et al.

[11] Patent Number: 5,272,476
[45] Date of Patent: Dec. 21, 1993

[54] DATA ACQUISITION SYSTEM HAVING NOVEL, LOW POWER CIRCUIT FOR TIME-DIVISION-MULTIPLEXING SENSOR ARRAY SIGNALS

[75] Inventors: Scot P. McArthur, Kaneohe, Hi.; Robert B. Williams; Jack R. Olson, both of San Diego, Calif.

[73] Assignee: The United States of America as represented by the Secretary of the Navy, Washington, D.C.

[21] Appl. No.: 681,230

[22] Filed: Apr. 4, 1991

[51] Int. Cl.[5] .............................................. H04Q 9/16
[52] U.S. Cl. ........................ 340/870.13; 340/825.07; 340/825.54
[58] Field of Search .............. 340/870.13, 310 R, 533, 340/825.07, 825.1, 825.11, 825.52, 825.54, 855.3, 855.4; 370/85.11, 85.9; 358/213.15; 364/707

[56] References Cited

U.S. PATENT DOCUMENTS

| | | |
|---|---|---|
| 4,139,737 | 2/1979 | Shimada et al. . |
| 4,160,238 | 7/1979 | Weckenmann et al. ........ 340/825.07 |
| 4,164,730 | 8/1979 | Weckenmann et al. ........ 340/825.11 |
| 4,241,444 | 12/1980 | Kister . |
| 4,466,097 | 8/1984 | Nose . |
| 4,536,748 | 8/1985 | Tonello .......................... 340/825.1 |
| 4,628,493 | 12/1986 | Nelson et al. . |
| 4,679,192 | 7/1987 | Vanbrabant .................... 340/825.52 |
| 4,698,802 | 10/1987 | Goke et al. . |
| 4,725,836 | 2/1988 | Guidos .......................... 340/825.52 |
| 4,728,803 | 3/1988 | Catchpole et al. ............. 358/213.15 |
| 4,916,692 | 4/1990 | Clarke et al. . |
| 4,952,817 | 8/1990 | Bolan et al. .................... 364/707 |

Primary Examiner—Donald J. Yusko
Assistant Examiner—John Edward Giust
Attorney, Agent, or Firm—Harvey Fendelman; Thomas G. Keough

[57] ABSTRACT

An electronic circuit architecture time-division-multiplexes analog sensor signals from a distributed sensor array onto a common transmission line in a digitally encoded format. The architecture synchronizes the multiplexing, sampling and encoding to ensure a proper settling of the analog data signals and is fabricated to be compact with low power consumption for a cost-effective implementation for a number of sensors.

3 Claims, 3 Drawing Sheets

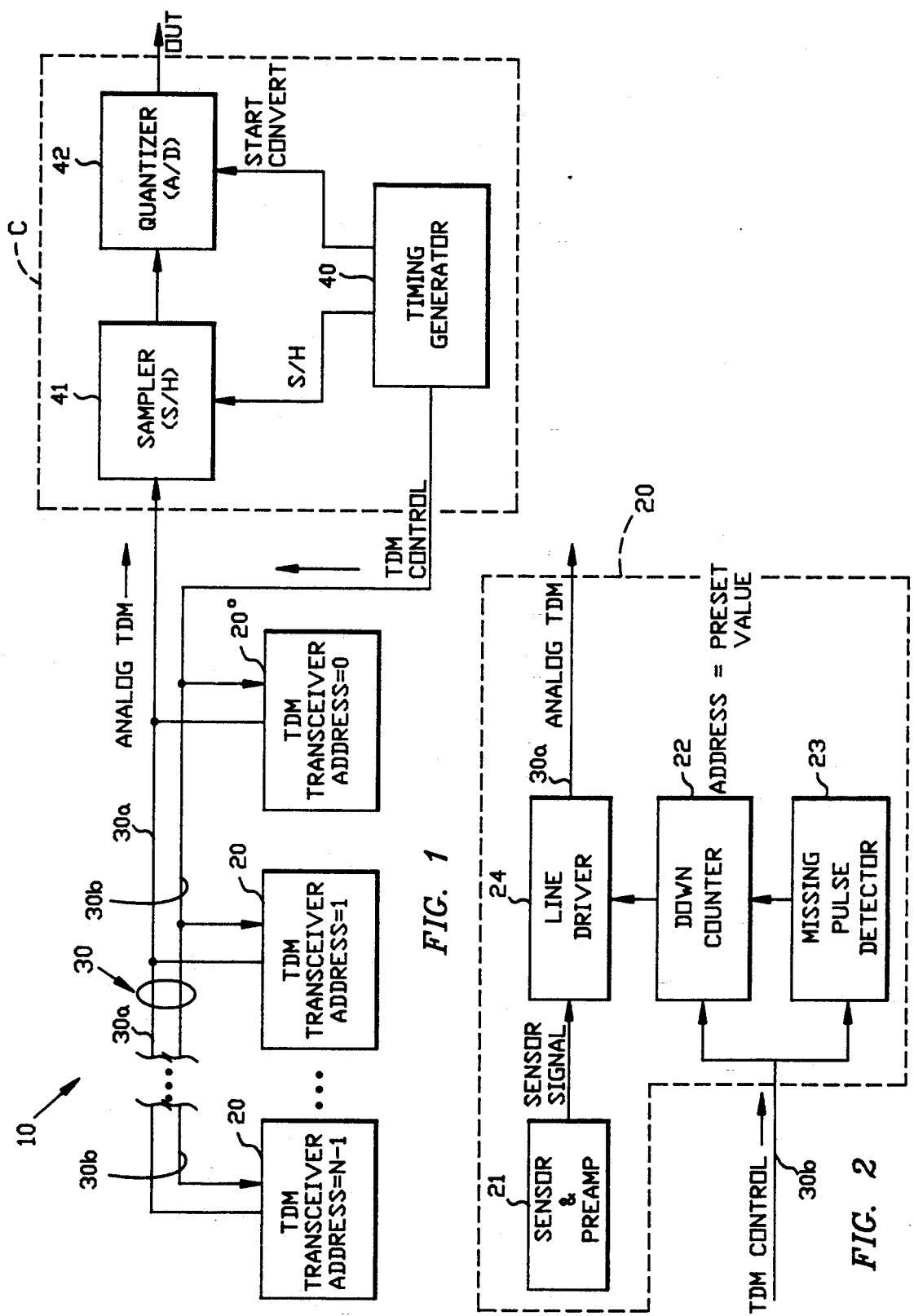

DATA ACQUISITION SYSTEM HAVING NOVEL, LOW POWER CIRCUIT FOR TIME-DIVISION-MULTIPLEXING SENSOR ARRAY SIGNALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method of synchronously time-division-multiplexing transducer signals from a multi-element distributed sensor array. If further pertains to a time division multiplexing technique using a digitally encoding portion of a data acquisition system through a three-wire cable. It more particularly pertains to a multiplexing technique that consumes very little power and is very compact, making it well suited for use in miniature, low power, high performance sensor systems such as tactical, surveillance and research hydrophone arrays and accelerometer arrays used for structural vibration analysis.

Two common multiplexing architectures used in data acquisition systems to accommodate sensor arrays are in widespread use, a first, and more simple, architecture is commonly used in general purpose computerized data acquisition systems. This architecture has one centrally located multiplexer circuit embedded within the data acquisition hardware which all of the sensor signals are directly routed to by two wire cables. The advantages of this technique are that it is simple to implement and maintain, and is low power at the sensor sites. A major disadvantage of this technique is that for many element sensor arrays (having greater than 10-20 sensor elements) the cable size becomes large, which will tend to corrupt the parameter being measured when operating in a dynamic medium.

The second architecture, normally used in complex systems such as in aircraft and ships, multiplexes digitally encoded sensor signals onto a two-wire digital data bus. A typical example of a two-wire digital data bus is commonly designated the MIL-STD-1553B and has generally been used as a data bus structure that supports a time division multiplexing technique. Each sensor site has an analog-to-digital converter which encodes the sensor signals, and a transceiver circuit which receives command words from, and transmits sensor data to, a system bus controller. The major advantages of the technique of the second architecture are that all multiplexing occurs over a small diameter, high noise immune, two-wire digital data bus, and that it can accommodate large quantities of sensors. The disadvantages of this technique are that it is complex, costly to develop and implement, and each sensor site consumes a moderate amount of power. In addition, the second technique does not lend itself to very compact sensor packaging.

Thus, a continuing need exists in the state of the art for a method of synchronously time-division-multiplexing transducer signals from a multi-element distributed sensor array to the digitally encoding portion of a data acquisition system through a three-wire cable that consumes very little power and is very compact, making it well suited for the use in miniature, low power, high performance, sensor systems.

SUMMARY OF THE INVENTION

The present invention is to provide a data acquisition system for the direct time-division-multiplexing of a plurality of analog data signals onto a single line. A plurality of sequential TDM transceivers are coupled to the line and are each provided with a missing pulse detector, a down counter, a line driver and an analog sensor that generates an analog data signal. The missing pulse detector is connected to the control conductor and the down counter; the down counter is connected to the control conductor and the line driver; and the line driver is connected to the analog data conductor, the down counter and the analog sensor.

A control circuit has a timing generator, a sampler circuit and a quantizer circuit. The timing generator is connected to a control conductor of the line to provide negative preset pulses for each missing pulse detector to initiate each repetitive time frame; the timing generator is connected to the control conductor to provide a series of negative strobe pulses within each time frame each at the beginning of separate ones of a series of time slots in each time frame; the timing generator is connected to the sampler circuit to provide a series of sample and hold signals, each at the end of separate ones of the series of the time slots in each time frame and; the timing generator is connected to the quantizer circuit to provide a series of convert signal pulses, each at the beginning of separate ones of a series of time slots in each time frame and each substantially coincident with each series of negative strobe pulses. Upon the generation of a plurality of the analog data signals from the plurality of sequential TDM transceivers, each missing pulse detector is initiated by the negative preset pulses from the timing generator to activate its interconnected down counter to receive a series of negative strobe signal pulses from the timing generator to connected its line driver to an analog data conductor when a predetermined amount of negative strobe signal pulses are received thereby to sequentially couple each analog data signal onto the analog data conductor and to allow each analog data signal to settle for over one-half the duration of a time slot until the appropriate sample and hold pulse signal initiates an appropriate sample-and-hold window and the appropriate convert signal pulse enables the digitizing of each analog data signal.

An object of the invention is to provide an improved method of synchronously time-division-multiplexing signals from a multi-element distributed sensor array.

Another object is to provide a method of synchronously time-division-multiplexing signals consuming very low power while being compact and cost effective.

Another object is to provide an improved synchronous time-division-multiplexing technique within a fiber optic telemetry system capable of accommodating a large number of sensors.

Yet another object of the invention is to provide a synchronous time-division-multiplexing technique for a large number of data gathering sensors implemented by integrated circuit techniques.

These and other objects of the invention will become more apparent from the ensuing specification and drawings when taken in conjunction with the appended claims.

BRIEF DESCRIPTION OF THE DRAWINGS

FIG. 1 is a block diagram representation of the TDM data acquisition system of this inventive concept.

FIG. 2 is a block diagram representation of one of the transceiver circuits provided with a sensor.

DESCRIPTION OF THE PREFERRED EMBODIMENT

Figure 3:
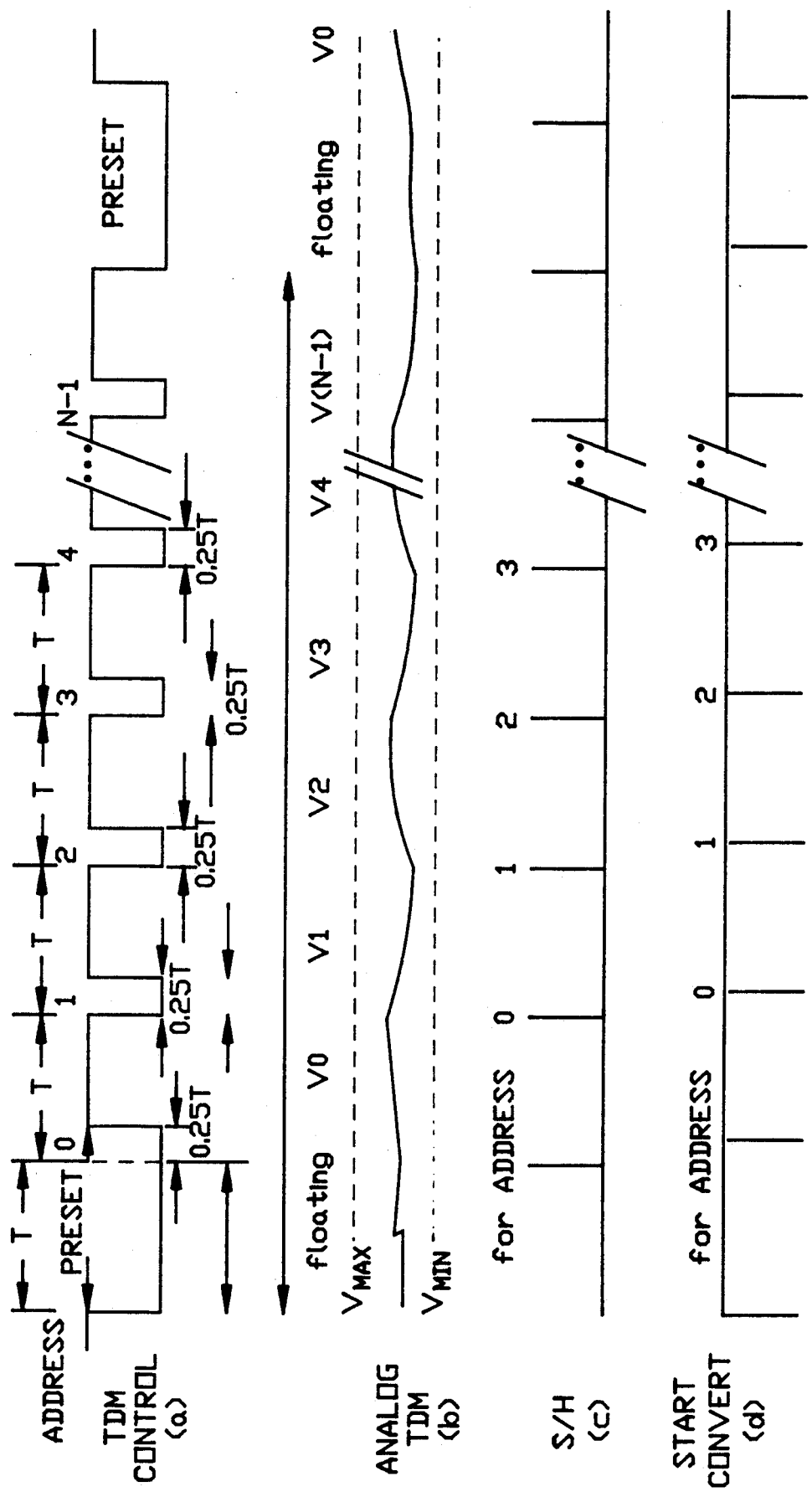
FIG. 3 are representative waveforms depicting the operation of the sequential TDM architecture.

Referring now to FIG. 1 of the drawings, a data acquisition system 10 fabricated in accordance with the teachings of this inventive concept enables the time-division-multiplexing (TDM) of analog sensor signals from a plurality of TDM transceivers 20 onto a common three-wire transmission line 30. A third wire of the three-wire common transmission line, not shown to avoid cluttering the drawings, is the common ground line which provides the signal reference between the sensors of each of the TDM receivers and the common encoding circuit made up of a sampler 41 and a quantizer 42. The common transmission line is provided with an analog time-division-multiplexing conductor 30a for transmitting analog signals from each TDM transceiver and a time-division-multiplexing control conductor 30b coupled to each of the transceivers for effecting the synchronous actuation thereof.

The multiplexing sequence afforded by this inventive concept is synchronized in accordance with signals coming from a control circuit C having a timing generator 40 that is interconnected to a sampler 41 and quantizer 42. The control circuit timing generator also is connected to all the TDM transceivers via conductor 30b and the control circuit sampler 41 is connected to the transceivers via conductor 30a. Thusly configured, the timing generator, or clock provides for an appropriately synchronized sampling and digitizing of the data acquisition system and that the analog signals from each of the transceivers have properly settled before encoding.

In other words one conductor 30b is the time-division-multiplexing control line which provides signals which initiate a sensor signal multiplexing sequence and assures synchronization of the digital encoding circuits made up of sampler 41 and quantizer 42. Analog time-division-multiplexing conductor 30a provides an information conduit for all the analog sensor signals from all of TDM Transceivers 20 in an appropriate, specific time slot as determined by the appropriate signals on conductor 30b.

Looking to FIG. 2, each TDM transceiver 20 is provided with an appropriate sensor 21 associated with a preamp. Each sensor can be any one of many appropriate instrumentations for monitoring some ambient phenomena such as pressure, as in the case of a hydrophone, or temperature, or velocity or some other suitable data gathering device.

An appreciation of the several very essential functions performed at each TDM transceiver must be in mind to appreciate the salient features of this inventive concept. The first function each TDM transceiver performs is the detection of the presence of the PRESET gap signal in the TDM control signal in a missing pulse detector circuit 23 which presets the transceiver down counter 22 to its predetermined assigned address value. The second function is performed by a counter 22 that counts the number of synchronizing strobe pulse signals sent out from timing generator 40 on TDM control conductor 30b between each PRESET gap time interval. The third function of the TDM transceiver circuit is to connect a line driver 24 to the analog TDM conductor 30a for one strobe pulse signal, when the down counter 22 is activated to indicate that the strobe pulse signal count equals an individual TDM transceiver's preprogrammed address. This preprogrammed address is a preset value for each TDM transceiver's down counter 22 which is unique to only that particular TDM transceiver, so that there is no conflict on the analog TDM line 30a among all the sensor's analog signals being transmitted over it.

Turning to FIG. 3, details and advantages of the operation of data acquisition system 10 becomes more apparent. FIG. 3 (a) depicts a TDM CONTROL signal from timing generator 40 over TDM control conductor 30b to all of TDM transceivers 20. The waveform of FIG. 3 (a) consists of one negative pulse of duration T plus 0.25T (the PRESET gap signal), followed by N negative pulse signals (strobes) of duration 0.25T each within each time slot T, (the time slot width associated with each sensor of each of TDM transceivers 20) and N is the number of sensors of the array of TDM transceivers. The reciprocal of T (N+1) is the rate at which each sensor signal appears on the analog TDM conductor 30a for sampling by the data acquisition system.

The data acquisition process is initiated with a PRESET gap pulse signal, such as that shown at the very beginning of the TDM CONTROL waveform of FIG. 3 (a). A missing pulse detector 23 at each TDM transceiver 20 functions as a PRESET gap pulse detector to force down or connect its interconnected down counter 22 output value to its assigned address whenever the PRESET pulse is received (at the beginning of each time frame). The PRESET pulse is a negative pulse of approximately 0.5T or greater (shown as T plus 0.25T in FIG.(a)) and starts each repetitive time frame of data acquisition system 10.

Each gap detector (missing pulse detector 23) is reset whenever the TDM CONTROL signal is a logic high (in this case at a negative value). Since the TDM control addressing strobe pulse signals are negative pulses of only 0.25T wide, the gap detectors (missing pulse detectors 23) will no trigger their interconnected down counters 22 and preset the counters during an addressing time slot each time a strobe pulse signal is received. Note that there is no negative transition between the completion of the PRESET pulse and the start of the first 0.25T strobe signal pulse (for address 0) since the first 0.25T strobe pulse signal is part of the PRESET pulse in this example. Within the first time slot T after the PRESET pulse preset (time slot 0), the data acquisition system has created a time slot which corresponds to addressing the TDM transceiver having an address value 0 (in this case TDM transceiver 20° to the far right in the TDM transceiver array depicted in FIG. 1). When TDM transceiver 20° is addressed at time slot 0, the TDM transceiver powers up its analog line driver 24 and connects its sensor signal output coming from its interconnected sensor and preamp 21 to analog TDM conductor 30a so that the sensor signal, along with others in their respective time slots in the time frame, appears essentially as represented by ANALOG TDM signal in FIG. 3, (b). The analog signal for address value 0 on the analog TDM conductor 30a is allowed to settle for most of the remainder of time slot T (which is well over one-half of the time slot T, or, more specifically in this example, nearly 0.75T) by positioning the 0 address sample-and-hold sampling window immediately before the next negative transition of 0.25T. The 0 address sample-and-hold window is initiated in sampler 41 by a narrow pulse width (or spike shaped) S/H pulse signal 0 from timing generator 40, see FIG. 3 (c).

The next negative transition of a 0.25T strobe pulse signal 1 marks the beginning of time slot 1 in which four events occur. The first event is a successive approximation analog-to-digital conversion process on the analog voltage from sensor 0 which is being held on the sample-and-hold output of sampler 41 that is initiated in quantizer 42 by START CONVERT signal 0 from timing generator 40, see FIG. 3 (d). The digitized signals from quantizer 42 are transmitted out of the data acquisition system via the OUT lead from quantizer 42. The second event is that the next negative strobe pulse signal decrements all down counters 22 of TDM transceivers 20 by one. The third event is that the address 0 analog line driver 24 of its respective TDM transceiver 20° is disconnected from analog TDM conductor 30a and its power is disconnected. The fourth event is that the next negative strobe pulse signal powers address 1 analog line driver 24 and connects its output to analog TDM conductor 30a to repeat the sequence. This process of sequentially time-division-multiplexing and digitally encoding each sensor voltage is continued as long as the TDM CONTROL SIGNAL provides sequences of negative PRESET and negative strobe pulse signals. The sensor TDM transceivers of the data acquisition system other than the one being actuated are set into a low power standby mode by holding the TDM control line 30b to a logic low level.

A typical implementation of this inventive concept of data acquisition 10 relies upon standard electronic circuit components to provide a very low power, compact, 32-element slack line hydrophone array. A sampling rate for each of the 32 hydrophones, functioning as sensors 21, was set to 189.3 Hz by dividing the TDM CONTROL SIGNAL into 33 160-microsecond time slots (T=160 microseconds). The TDM control logic levels were +1.5 volts ($V_{HI}$) and −1.5 volt ($V_{LOW}$), and the analog TDM signal range was ±0.5 volts. The sampling circuit was a low power op-amp acting as a fixed gain stage, and a LM398 sample-and-hold amplifier 41 operating with an overall output error of less than −60 dB. Quantizer 42 employed an integrated circuit chip of the designation ADC1210, a micropower 12-bit resolution, successive approximation analog-to-digital converter. The ADC1210 conversion time was set to be 120 microseconds. This is the settling time which has been found to assure a satisfactory signal processing capability for the data acquisition system.

A transmission line 30 typically is a hydrophone array line having two surlyn polymer insulated 26-gauge stranded wires, and one 25-gauge bare solid copper wire. The three wires were sewn together with nylon thread, along with two yarns of kevlar. The kevlar acts as the cable's primary strength or load-bearing member, and the insulated wires function as TDM control conductor 30b and analog TDM signal conductor 30a, while the bare copper wire provided the DC ground reference between the sensor and the digital encoding circuits and salt water was relied upon to act as the AC ground reference. Conductors 30a and 30b were insulated with the material marketed under the trade designation Surlyn, having the properties for providing a low permitivity polymer to 60 mils outer diameter. The resulting small signal capacitance to AC ground (which in this case is sea water) was found to be 100 pF/meter. The hydrophone, or sensor 21, spacing for one particular application was 15 meters with a 100-meter spacing between the digital encoding electronics C (timing generator 40, sampler 41 and quantizer 42) and the first of TDM transceivers 20 making up the string of hydrophones, so that the total line length was about 565 meters.

Figure 4:
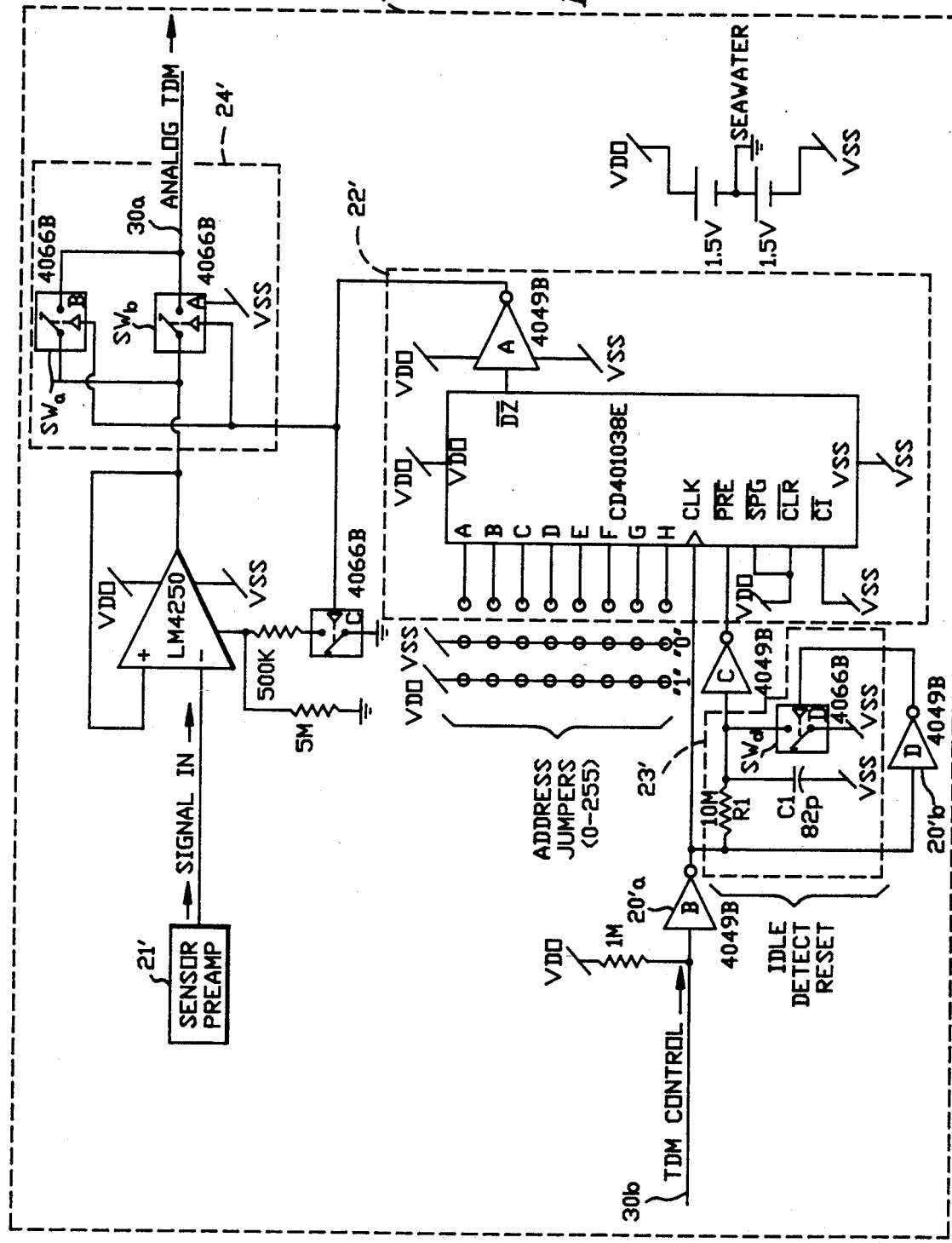
FIG. 4 shows a hydrophone transceiver circuit schematic as the transceiver circuit provided with a sensor.

Referring now to FIG. 4, details of a TDM transceiver 20' that is associated with the hydrophone sensors 21' are set forth as an illustrative embodiment of this concept. An RCA CD40103BE was relied upon to function at an 8-bit binary down counter 22' which counts the strobe pulses transmitted over TDM control conductor 30b. The particular transceiver 20' had an address that was set from 0 to 255 by jumper-wiring-programming the straight binary 8-bit input to counter 22' during its assembly. $R_1$, $C_1$ and the CD4066B CMOS switch $SW_d$ make up the missing pulse, or gap detector circuit, 23' which, in this case, has a time constant of approximately one half the time slot interval of 80 microseconds.

An LM4250 programmable op-amp and CMOS switches $SW_a$ and $SW_c$ make up analog line driver 24' which has a low power tristate mode (in the tristate mode the driver consumes less than 1 microwatt). When activated and connected to the 48 nF load of analog TDM conductor 30a, the output of the line driver settles to its final value within 80 microseconds (one half of the time slot T). The 4049BE inverters 20'a and 20'b function to buffer and invert the logic level of the incoming digital signals which are transmitted over TDM control conductor 30b. The entire circuit is powered from two 1.5-volt silver oxide button batteries in series, with the center tap being the ground reference which, in this case, is coupled to ambient seawater. The average power consumption of a hydrophone transceiver is less than 30 microwatts. The estimated continuous operation time for the transceiver circuit is over one year on one pair of batteries.

This inventive concept provides for a very low power, compact and cost-effective method of multiplexing hydrophone signals from a linear hydrophone array to the digital encoding circuits within an overall fiber optic telemetry system. Unique features of direct time-division-multiplexing of the analog sensor signals onto a single line and the single strobe addressing method for the sensor transceivers assures the consumption of less analog signal multiplexing power and a reduction of the circuitry associated with each sensor interconnected to a three-wire cable as compared to conventional techniques. The addressing scheme requires only one 25 percent duty cycle negative strobe pulse signal per sensor transceiver (assuming transceiver address values are consecutively ordered) and one PRESET 100% duty cycle negative pulse per sampling cycle. Other contemporary digital bus multiplexing architectures randomly address each sensor transceiver with an address word which is at least the rounded up integer value of $\log_2 N$, where N is the number of transceivers in the network. For arrays with more than 16 sensors the single 25 percent duty cycle strobe pulse sequential addressing scheme is more efficient in transmission bandwidth and power consumption than the digital word addressing scheme.

The salt water AC ground performs two functions with respect to the employment of the hydrophone array. The salt water AC ground effectively is the outer conductor of a coaxial cable made up of a single insulated wire, where the insulation separates the center conductor from the highly conductive seawater. The salt water AC ground also significantly decreases the capacitive coupling from the digital line into the analog line with the consequent improvement in data processing capabilities.

The above described data acquisition system has been designed with standard low power electronic components. Even more power conservation approach would rely on a single chip transceiver implemented on a low voltage BiCMOS integrated circuit. Sensor and sample rate limitations may be introduced by the analog TDM line capacitance and analog driver output impedance combination, and not on the multiplexing architecture so that improved performance may result if cable capacitance and line driver output impedance appropriately is reduced to increase sensor quality and sample rates. Non-underwater applications can rely on coaxial cables having their shields grounded to minimize cross coupling and noise pickup between the analog TDM and control TDM signals.

Obviously, many modifications and variations of the present invention are possible in the light of the above teachings. It is therefore to be understood that within the scope of the appended claims, the invention may be practiced otherwise than as specifically described.

I claim:

1. A data acquisition system for the direct time-division-multiplexing of a plurality of analog data signals onto a single line having a control conductor and an analog data conductor comprising:

a plurality of sequential TDM transceivers coupled to said single line each provided with a missing pulse detector, a down counter, a low power mode line driver and an analog sensor that generates an analog data signal, said missing pulse detector is connected to said control conductor and said down counter, said down counter is connected to said control conductor and said line driver, and said line driver is connected to said analog data conductor and said analog sensor and a control circuit connected to said plurality of sequential TDM transceivers via said control conductor and said analog data conductors having a timing generator, a sampler circuit and a quantizer circuit, said timing generator is connected to said control conductor and provides negative preset pulses for each said missing pulse detector of each of said plurality of sequential TDM transceivers to initiate each repetitive time frame and provides a series of negative strobe pulses within each said time frame each at the beginning of separate ones of a series of time slots in each said time frame, said timing generator is connected to said sampler circuit and provides a series of sample-and-hold signals, each at the end of separate ones of said series of said time slots in each said time frame and said timing generator is connected to said quantizer and provides a series of convert signal pulses, each at the beginning of separate ones of a series of time slots in each said time frame and each coincident with each of said series of negative strobe pulses, upon the generation of a plurality of said analog data signals each from a separate one of said plurality of sequential TDM transceivers, each said missing pulse detector is initiated by said negative preset pulses from said timing generator to activate its interconnected said down counter to receive said series of said negative strobe signal pulses from said timing generator to connect its said line driver to said analog data conductor when a predetermined amount of said negative strobe signal pulses are received thereby to sequentially couple each said analog data signal onto said analog data conductor and to allow each said analog data signal to settle in said sample circuit for over one-half the duration of a time slot until the appropriate said sample-and-hold pulse signal initiates an appropriate sample-and-hold window and the appropriate said convert signal pulse enables a digitizing by said quantizer circuit of each said analog data signal, in which said negative preset pulses are each a 100 percent duty cycle negative pulse at the beginning of each said time frame to initiate a sampling cycle thereof and said negative strobe pulses are each a 25 percent duty cycle per time slot negative strobe pulse at the beginning of each time slot for each respective TDM receiver to assure that its associated said analog data signal is allowed to settle in the interconnected said sampler circuit for the duration of its respective time slot to further assure that said sampler circuit and said quantizer circuit are actuated with a minimum power drain.

2. An apparatus according to claim 1 in which said 25 percent duty cycle per time slot negative strobe pulse assures an addressing scheme requiring only one 25 percent duty cycle per time slot negative pulse per sensor of each said TDM transceiver.

3. An apparatus according to claim 2 in which said timing generator provides a said preset negative pulse at the beginning of each time frame and sequential 25 percent duty cycle per time slot negative strobe pulses at the beginning of each time slot within each said frame and said timing generator further provides said sample-and-hold enabling pulses to said sampler circuit prior to an initiation of the next 25 percent duty cycle per time slot negative strobe pulse in each time slot to assure a suitable sampling time for each said analog data signal and said timing generator provides said convert signal pulses for said quantizer circuit to enable said digitizing therein.

* * * * *